(12) United States Patent
Efthymiou et al.

(10) Patent No.: US 8,979,620 B2
(45) Date of Patent: Mar. 17, 2015

(54) SEAT CONDITIONING HOOD APPARATUS AND METHOD

(75) Inventors: Peter P. Efthymiou, Tecumseh (CA); Paul Stichhaller, LaSalle (CA); Marinko Lazanja, Windsor (CA); Matthew Zuzga, Macomb, MI (US)

(73) Assignee: W.E.T. Automotive Systems AG, Odelzhausen (DE)

( * ) Notice: Subject to any disclaimer, the term of this patent is extended or adjusted under 35 U.S.C. 154(b) by 728 days.

(21) Appl. No.: 12/528,861

(22) PCT Filed: Nov. 11, 2008
(Under 37 CFR 1.47)

(86) PCT No.: PCT/US2008/083077
§ 371 (c)(1),
(2), (4) Date: Jul. 21, 2010

(87) PCT Pub. No.: WO2009/070439
PCT Pub. Date: Jun. 4, 2009

(65) Prior Publication Data
US 2012/0003909 A1    Jan. 5, 2012

Related U.S. Application Data

(60) Provisional application No. 60/990,389, filed on Nov. 27, 2007.

(51) Int. Cl.
*B60H 1/00* (2006.01)
*B23P 19/00* (2006.01)
*B60N 2/56* (2006.01)

(52) U.S. Cl.
CPC .......... *B60H 1/00507* (2013.01); *B60N 2/5621* (2013.01)
USPC ............................................ 454/120; 29/428

(58) Field of Classification Search
USPC .......................................................... 454/120
See application file for complete search history.

(56) References Cited

U.S. PATENT DOCUMENTS

| | | | | |
|---|---|---|---|---|
| 3,671,095 A * | 6/1972 | Johnson | | 312/352 |
| 4,773,197 A * | 9/1988 | Sullivan | | 52/220.1 |
| 5,626,202 A * | 5/1997 | Barnes et al. | | 180/68.1 |
| 5,924,766 A * | 7/1999 | Esaki et al. | | 297/180.13 |
| 6,644,735 B2 * | 11/2003 | Bargheer et al. | | 297/180.13 |
| 6,871,696 B2 | 3/2005 | Aoki et al. | | |
| 2004/0195870 A1 * | 10/2004 | Bohlender et al. | | 297/180.1 |

(Continued)

FOREIGN PATENT DOCUMENTS

JP    05-000623 A    1/1993

OTHER PUBLICATIONS

Snap fit fastener—2006.*
Search Report & Written Opinion dated Jun. 24, 2009, International Application No. PCT/US2008/083077.

*Primary Examiner* — Alissa Tompkins
*Assistant Examiner* — Nathaniel Herzefeld
(74) *Attorney, Agent, or Firm* — The Dobrusin Law Firm, P.C.

(57) ABSTRACT

A hood article and a method of use for a seat conditioning assembly. The hood article including an air-impermeable housing with an internal hollow chamber and at least a first aperture adapted and a second aperture to connect an air mover to a collar device of an air distribution system assembly. The hood article used for fluidly connecting the air mover to the air distribution system assembly.

15 Claims, 4 Drawing Sheets

(56) References Cited

U.S. PATENT DOCUMENTS

| | | |
|---|---|---|
| 2005/0093347 A1* | 5/2005 | Bajic et al. ............... 297/180.13 |
| 2006/0060344 A1 | 3/2006 | Esaki |
| 2006/0290176 A1* | 12/2006 | Aoki .......................... 297/180.1 |
| 2007/0176471 A1* | 8/2007 | Knoll ........................ 297/180.14 |
| 2007/0200398 A1* | 8/2007 | Wolas et al. ............. 297/180.15 |
| 2007/0241592 A1* | 10/2007 | Griffin et al. .............. 297/180.1 |
| 2008/0060131 A1* | 3/2008 | Tompkins .......................... 5/423 |
| 2008/0143152 A1* | 6/2008 | Wolas ....................... 297/180.14 |

\* cited by examiner

SEAT CONDITIONING HOOD APPARATUS AND METHOD

CLAIM OF PRIORITY

The present application is a National Phase filing from PCT/US2008/083077 which claims the benefit of the filing date of U.S. Provisional Application Ser. No. 60/990,389; filed: Nov. 27, 2007, hereby incorporated by reference.

FIELD OF THE INVENTION

The present invention relates to an apparatus and method of use to connect an air mover to a distribution system, more particularly to provide an apparatus and method of use to connect an air mover to an air distribution system in fluid communication with the surface of an automotive seat.

BACKGROUND OF THE INVENTION

It is well known that vehicles are being equipped with a variety of features to enhance the comfort of its occupants, particularly features such as ventilated, heated and/or cooled seats (e.g. seat conditioning systems). These seat conditioning systems can add cost and complexity to the seats and to the assembly of these seats. It is desirous to design a seat conditioning system such that the assembler can install it consistently and easily. Many seat conditioning systems are constructed of multiple components that are assembled or connected when the complete seat is put together (e.g. the air mover and the distribution system). To this end, the present invention seeks to improve on the ease of assembling two main components of a seat conditioning system by the use of a unique hood component.

SUMMARY OF THE INVENTION

The present invention is an improved hood article and method of using the article in connecting an air moving device to a fluid distribution system within an automotive seat.

Accordingly, pursuant to one aspect of the present invention, there is contemplated a hood article for a seat conditioning assembly comprising an air-impermeable housing that may include an internal hollow chamber with at least a first aperture adapted to connect to an air mover and with at least a second aperture adapted to connect to a collar device of a air distribution system assembly; wherein the air mover may be in fluid communication with the air distribution system via the internal hollow chamber.

The invention may be further characterized by one or any combination of the features described herein, such as the at least first aperture may include a plurality of connection devices that allows the hood article to be connected at a plurality of positions radially about the air mover. The least a second aperture that may include at least one hole for receiving a tab on the collar device and at least one snap feature for engaging at least one hole in the collar device. At least a surface adjacent to the first aperture for receiving a sealing material to substantially fluidly seal the interface of the first aperture and the air mover. At least a surface adjacent to the second aperture for receiving a sealing material to substantially fluidly seal the interface of the second aperture and the collar device. The air-impermeable housing may include at least a bottom wall and a top wall interconnected by at least two side walls, a rear wall portion and a front wall portion for defining the internal hollow chamber. The second aperture may be disposed on the bottom wall and the first aperture may be disposed on the front wall portion.

Accordingly, pursuant to another aspect of the present invention, there is contemplated a method of connecting an air mover to an air distribution system assembly with a vehicle seat, that may include the steps of: (a) providing the air mover for communicating air through the vehicle seat, wherein the air mover may be connectively fixed to the seat; (b) providing the air distribution system assembly; wherein the air distribution system assembly may be connectively fixed to the seat and wherein the air distribution system assembly includes a collar device; (c) providing a hood article that may include a first aperture adapted to fluidly connect to the air mover and a second aperture adapted to fluidly connect to the collar device; (d) attaching the hood article to the air mover such that the second aperture may be positioned substantially parallel to the collar device; and (e) attaching the hood article at the second aperture to the collar device.

DETAILED DESCRIPTION

Figure 1:
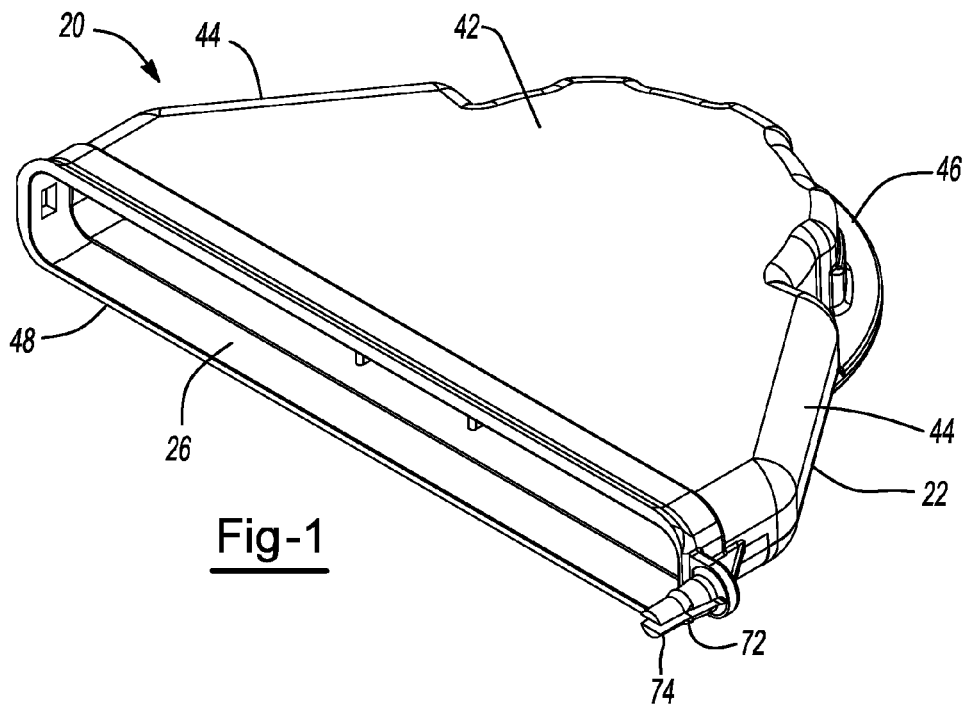
FIG. 1 illustrates a top perspective view of an exemplary hood article per the teachings of the present invention.
Figure 2:
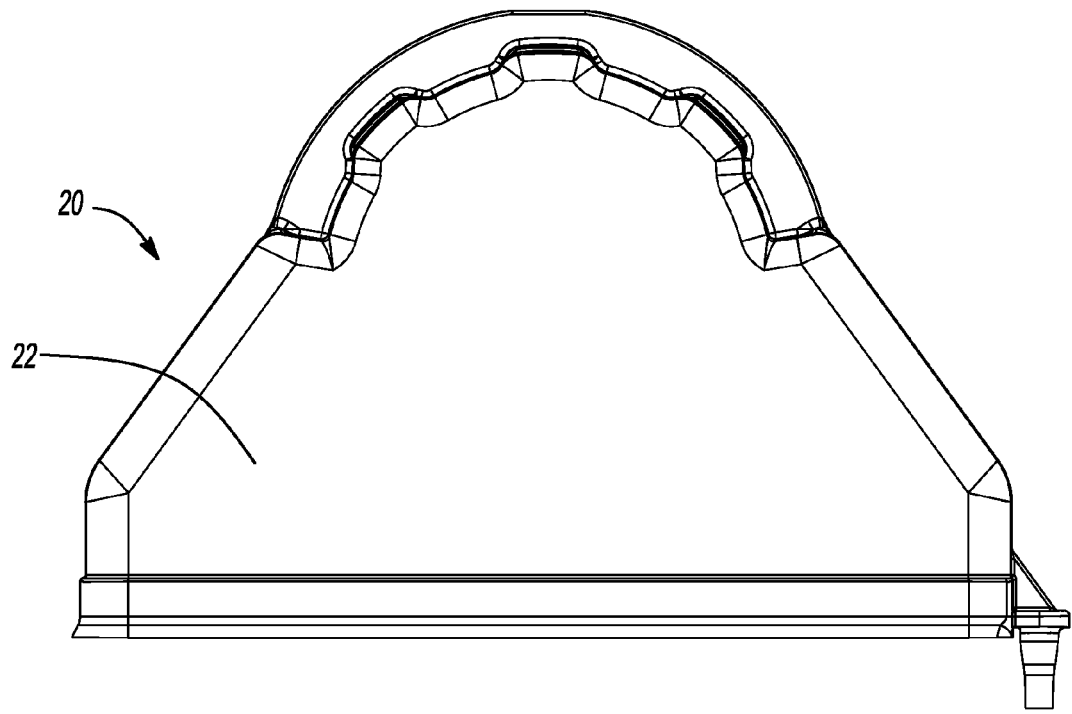
FIG. 2 illustrates a top (plan) view of an exemplary hood article per the teachings of the present invention.
Figure 3:
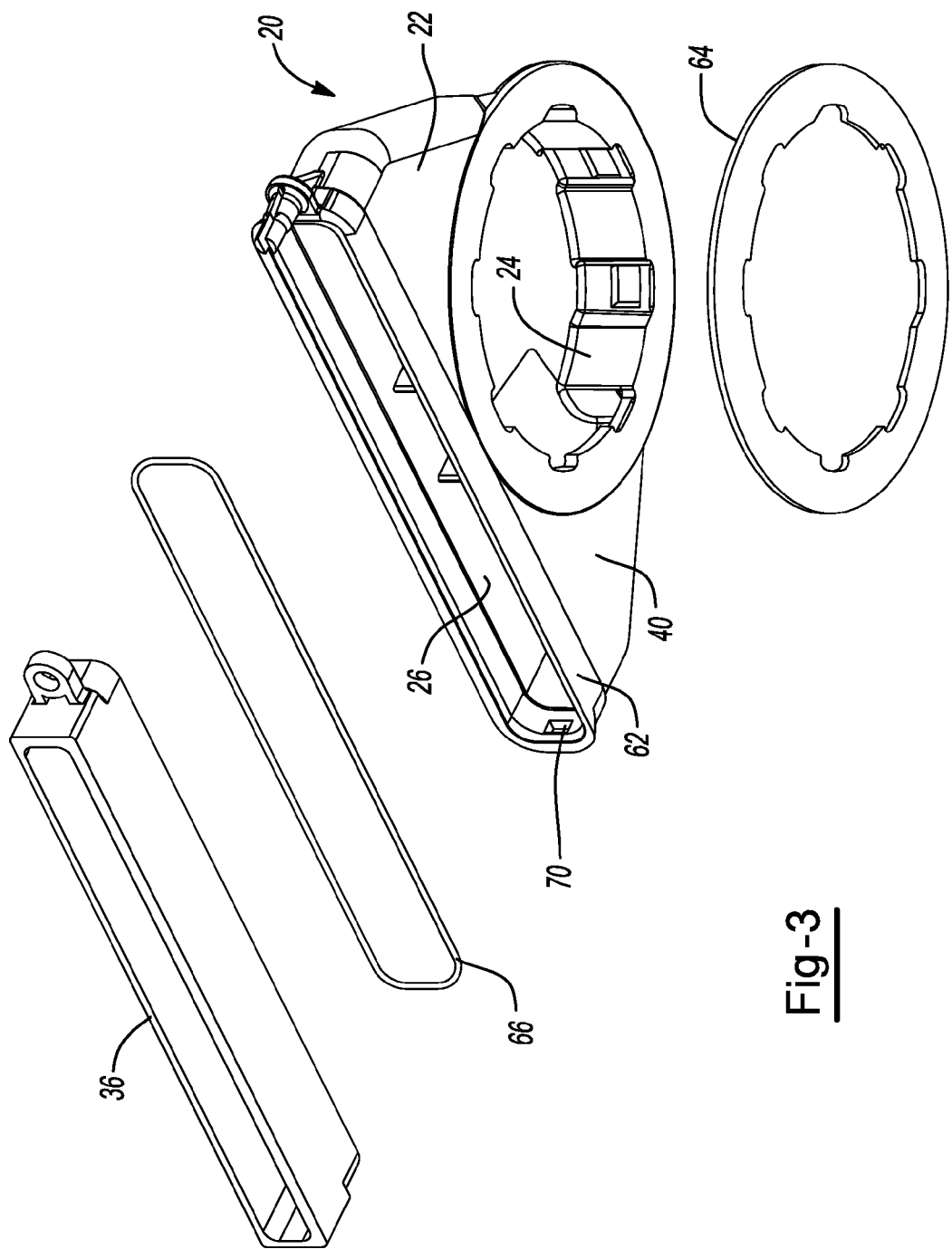
FIG. 3 illustrates an exploded bottom perspective view of an exemplary hood article, with one or more sealing materials and a collar device per the teachings of the present invention.
Figure 4:
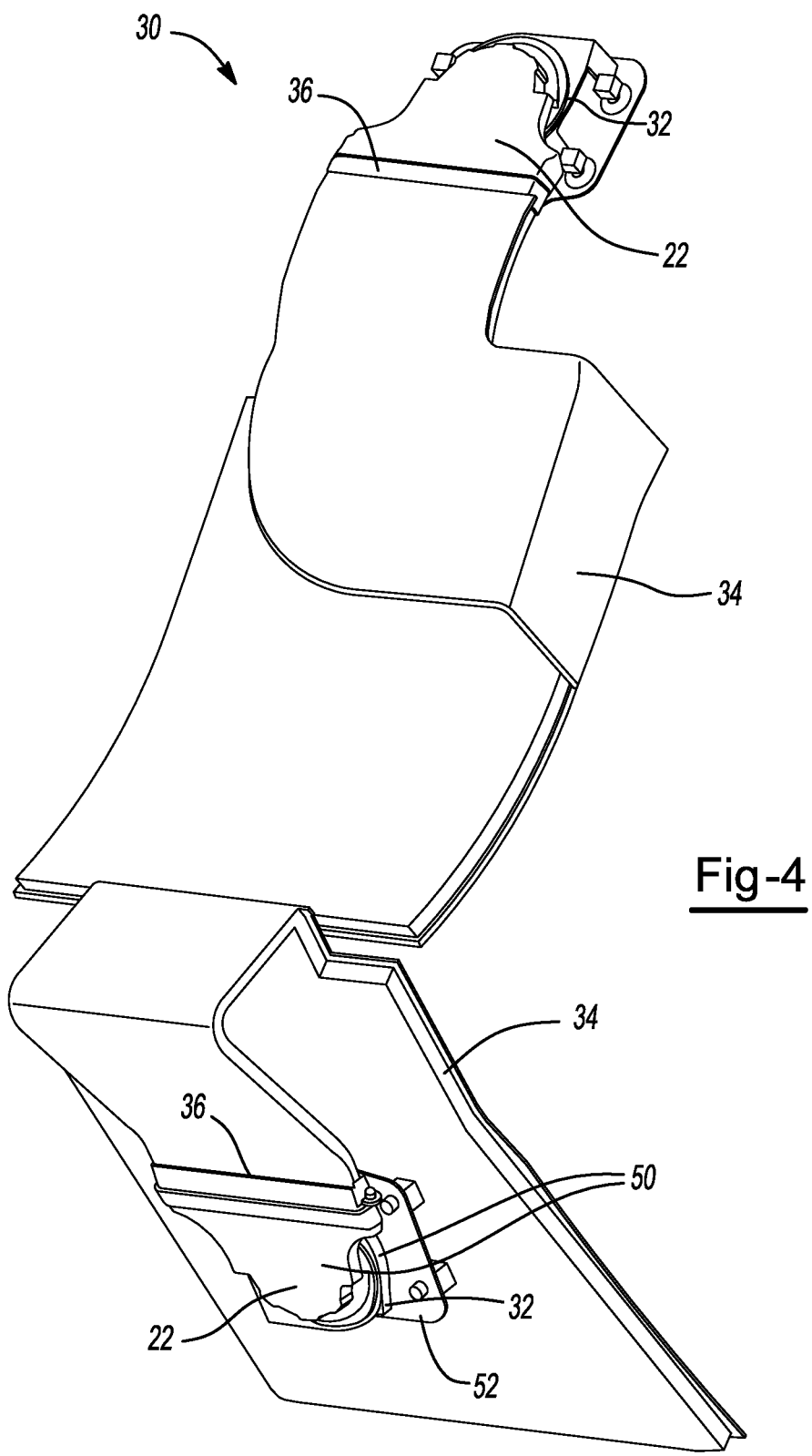
FIG. 4 illustrates a perspective view of exemplary hood articles per the teachings of the present invention installed in an exemplary fluid distribution system for a seat.
Figure 5:
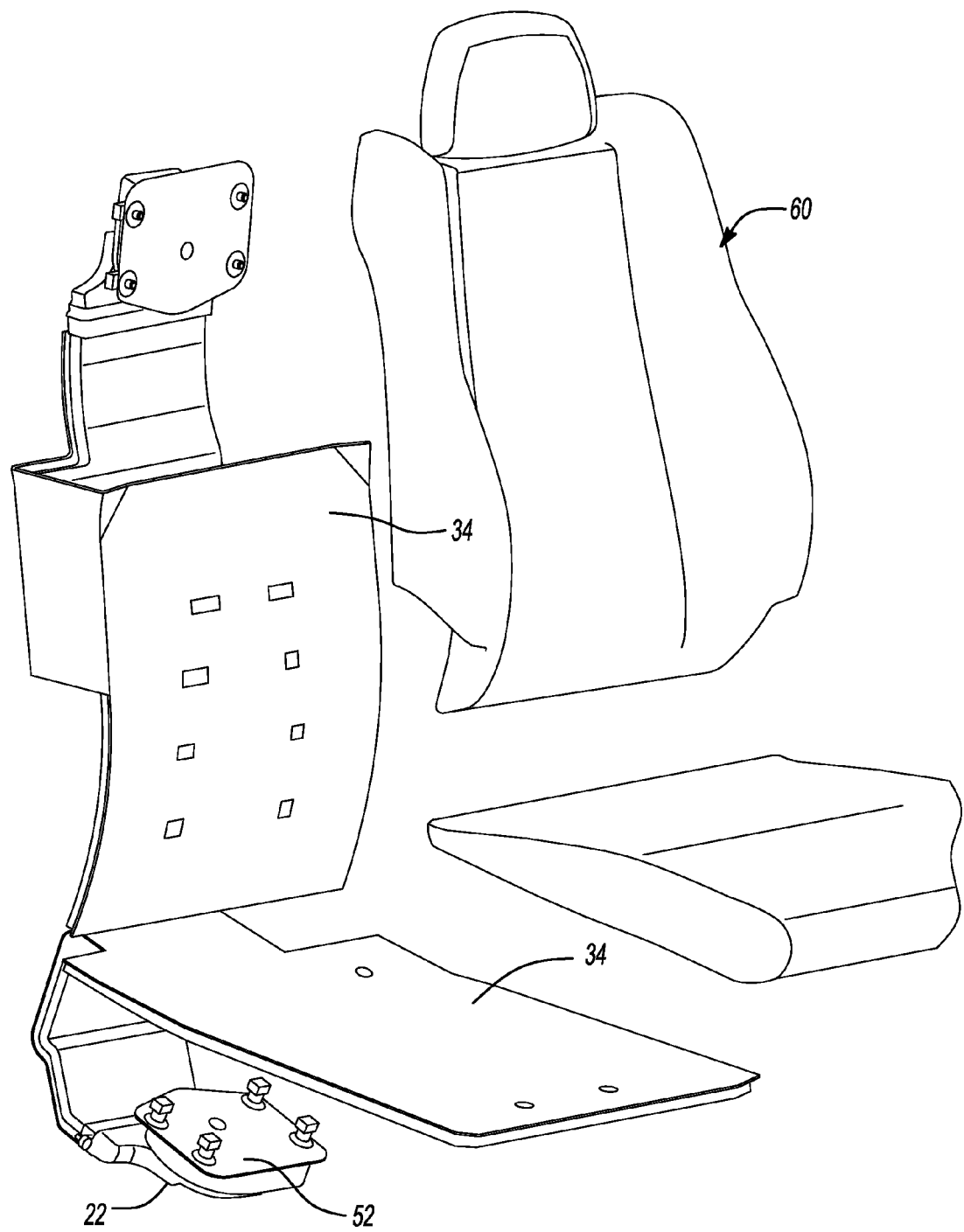
FIG. 5 illustrates an exploded perspective view of an exemplary fluid distribution system and a seat according to the teachings herein.

As illustratively depicted in FIGS. 1-4, the present invention is directed at an improved hood article and method of using the article in connecting an air moving device to a fluid distribution system (e.g. air distribution system assembly 34) within an automotive seat.

In general, the invention contemplates a hood article 20 for use in a conditioning, system 30 of a vehicle seat 60. The hood article 20 may be used to connect an air mover 32 of conditioning system 30 to a collar device 36 on an air distribution system assembly 34 of the conditioning system 30. The hood article 20 is generally a hollow air-impermeable housing 22 with at least a first 24 and second 2 aperture. It is contemplated that the air-impermeable housing 22 may be constructed of a ridged material (e.g. a plastic, metal, or composite material), but may also be constructed of a semi-flexible material (e.g. molded polyurethane). The air-impermeable housing 22 may include at least a bottom wall 40 and a top wall 42 interconnected by at least two side walls 44, a rear wall portion 46 and a front wall portion 48 for defining the internal hollow chamber. The first aperture 24 may be disposed through the bottom wall 40 and the second aperture 26 may be disposed through the front wall portion 48. It is also contemplated that the hood article 20 can be adapted to house and/or secure additional components (e.g. wire harnesses, sensors, switching relays, seat trim, etc.) within the housing and/or through fixation means (e.g. snaps, holes, adhesives). The conditioning system 30 may include an air mover sealing material 64 for fluidly sealing the interface of the first aperture 24 and the air mover 32. The conditioning system 30 may include a collar sealing material 66 for fluidly sealing the interface of the second aperture 26 and the collar device 36.

The second aperture 26 may include an internal limiting flange 62. The first aperture 24 and the second aperture 26 are preferably in an angled relationship. For example, the second aperture 28 may be perpendicular to the first aperture 24. The second aperture may 26 include at least one hole 70 for receiving a tab on the collar device and at least one snap 72 feature for engaging at least one hole in the collar device. For example, the snap feature 72 may include a split pin 74.

In a first embodiment, it is contemplated that the first aperture 24 is generally configured to fit over the output area of the air mover so that the fluid from the air mover 32 enters the hood article 20 through this first aperture 24, or alternatively exits it in the case when the air mover is pulling the fluid from the system. In a preferred aspect, the first aperture 24 may have a generally circular shape, but could be any number of shapes (e.g. square, triangular, oblong, elliptical, or the like) and includes a plurality of attachment features (e.g. snap tabs, hook receiving structures, and the like) or even may be a friction fit. The attachment features may be located such that the hood article 20 can be attached at a plurality of locations (radially) to the air mover 32 at an interface plane. In another preferred aspect, there optionally may be a gasket type material disposed between the first aperture 24 and the interface plane to aid in fluidly sealing the connection therebetween. In one preferred embodiment, the hood article 20 and the air mover 32 are combined to form an air mover assembly 50. In this embodiment, the air mover assembly 50 can be attached at a plurality of locations (radially) upon an air mover mounting plate 52.

It is contemplated that the second aperture 26 is generally configured to connectively fit to the collar device 36 which serves as an interface to the air distribution system assembly 34 of the conditioning system 30. In a preferred aspect, the second aperture 26 may have an oblong shape, but could also be any number of shapes, and includes a plurality of attachment features (e.g. snap tabs, hook receiving structures, friction fit, and the like) for attaching to the collar device 36. In another preferred aspect, there optionally may be a gasket type material disposed between the second aperture 26 and the collar device 36 to aid in fluidly sealing the connection therebetween.

In a second embodiment, it is contemplated that there may be a third or more apertures on the hood device for providing fluid communications from the air mover 32 to additional air distribution system assemblies.

In a third embodiment, a method of connecting an air mover 32 to an air distribution system assembly 34 with a vehicle seat is contemplated, which may include the steps of: (a) providing the air mover 32 for communicating air through the vehicle seat, wherein the air mover is connectively fixed to the seat; (b) providing the air distribution system assembly 34; wherein the air distribution system assembly may be connectively fixed to the seat and wherein the air distribution system assembly 34 may includes a collar device 36; (c) providing a hood article 20 including a first aperture 24 adapted to fluidly connect to the air mover 32 and a second aperture 26 adapted to fluidly connect to the collar device 36; (d) attaching the hood article 20 to the air mover 32 such that the second aperture 26 is positioned substantially parallel to the collar device 36; and (e) attaching the hood article 20 at the second aperture 26 to the collar device 36.

Unless stated otherwise, the method depicted herein is not intended to be restrictive of the invention, and other dimensions or geometries are possible. In addition, while a feature of the present invention may have been described in the context of only one of the illustrated embodiments, such feature may be combined with one or more other features of other embodiments, for any given application.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of connecting an air mover to an air distribution system assembly with a vehicle seat, including the steps of:
(a) providing the air mover for communicating air through the vehicle seat,
(b) connecting the air mover to a b-side of the seat;
(c) providing the air distribution system assembly; wherein the air distribution system assembly is connectively fixed to an a-side of the vehicle seat and wherein the air distribution system assembly includes a main section that communicates air between the air distribution system and the a-side of the seat, and a second section that communicates air between the main section and the b-side of the seat and includes a collar device at a distal end of the second section opposite the main section;
(d) providing a hood article including a first aperture adapted to fluidly connect to the air mover and a second aperture adapted to fluidly connect to the collar device;
(e) attaching the hood article directly to the air mover; and
(f) attaching the hood article at the second aperture to the collar device;
wherein the hood article comprises an air-impermeable housing that includes an internal hollow chamber connecting the first aperture and the second aperture;
wherein the air-impermeable housing includes a plurality of walls and the first and second apertures are located on adjacent walls; and
wherein the housing of the hood article communicates air with the air distribution system in a first direction, and communicates air with the air mover in a second direction that is different than the first direction wherein the second aperture includes at least one engagement hole for receiving a tab on the collar device and the second aperture includes at least one snap feature for engaging at least one hole in the collar device, wherein the step of attaching the hood article with at the second aperture includes a step of engaging the snap feature on the hood article with the at least one hole in the collar device and a step of engaging the snap feature of the collar with the engagement hole in the hood article, wherein the snap feature of the second aperture for engaging the collar device includes a pin having a split.

2. The method of claim 1, wherein the first aperture includes a plurality of connection devices so that the hood article is connected radially to the air mover.

3. The method of claim 2, wherein the housing includes a surface adjacent to the first aperture for receiving a sealing material, and the method includes a step of receiving the sealing material on the surface adjacent to the first aperture for sealing the attachment between the first aperture and the air mover with the sealing material.

4. The method of claim 3, wherein the housing includes a surface adjacent to the second aperture for receiving a sealing material, and the method includes a step of receiving the sealing material on the surface adjacent to the second aperture for sealing the attachment between the second aperture and the collar device with the sealing malarial.

5. The method of claim 2, wherein the step of attaching the hood article directly to the air mover includes a step of fitting the first aperture directly over an output area of the air mover so that the output area is radially connected to the air mover by the plurality of connection devices and fluid from the air mover directly enters the hood article through the first aperture.

6. The method of claim 1, wherein the step of attaching the hood article at the second aperture includes a step of engaging a snap feature on the hood article with at least one hole in the collar device.

7. The method of claim 1, wherein the housing includes a surface adjacent to the first aperture for receiving a sealing material, and the method includes a step of receiving the sealing material on the surface adjacent to the first aperture for sealing the attachment between the first aperture and the air mover with the sealing material.

8. The method of claim 1, wherein the housing includes a surface adjacent to the second aperture for receiving a sealing material, and the method includes a step of receiving the sealing material on the surface adjacent to the second aperture for sealing the attachment between the second aperture and the collar device with the sealing material.

9. The method of claim 1, wherein the system is configured so that the air mover is pulling fluid from the system, wherein the fluid exits the hood article through the first aperture.

10. The method of claim 1, wherein the second aperture is angled relative to the first aperture.

11. The method of claim 1, wherein the second aperture and the first aperture are perpendicular.

12. The method of claim 1, wherein the second aperture includes an internal limiting flange.

13. A method of connecting an air mover to an air distribution system assembly with a vehicle seat, including the steps of:
  (a) providing the air mover for communicating air through the vehicle seat,
  (b) connecting the air mover to a b-side of the seat;
  (c) providing the air distribution system assembly; wherein the air distribution system assembly is connectively fixed to an a-side of the vehicle seat and wherein the air distribution system assembly includes:
    1. a main section that communicates air between the air distribution system and the a-side of the seat,
    2. a second section that communicates air between the main section and the b-side of the seat, and
    3. a collar device that is connected to and extends from a distal end of the second section, which is opposite the main section and located on the b-side of the seat;
  (d) providing a rigid hood article including a first aperture adapted to fluidly connect to the air mover and a second aperture adapted to fluidly connect to the collar device;
  (e) attaching the first aperture of the hood article over an output area of the air mover so that air from the air mover directly enters the hood article through the first aperture or directly exits the first aperture of the hood article into the air mover when the air mover is pulling the air from the air distribution system; and
  (f) attaching the hood article at the second aperture directly to the collar device;
  wherein the hood article comprises;
    an air-impermeable housing that includes an internal hollow chamber connecting the first aperture and the second aperture;
    the air-impermeable housing includes at least a bottom wall and a top wall interconnected by at least two side walls, a rear wall portion and a front wall portion for defining the internal hollow chamber; and
    the first aperture is disposed on and through the bottom wall and the second aperture is disposed on and through the front wall portion; and
  wherein the housing of the hood article communicates air with the air distribution system in a first direction, and communicates air with the air mover in a second direction different than the first direction wherein the main section is fixedly connected on the a-side of the vehicle seat and the second section extends from the a-side to the b-side, the second aperture and the first aperture are perpendicular; the air-impermeable housing is constructed of a plastic, metal, or composite material; the second aperture includes at least one engagement hole for receiving a tab on the collar device and the second aperture includes at least one snap feature for engaging at least one hole in the collar device, wherein the step of attaching the hood article at the second aperture includes a step of engaging the snap feature on the hood article with the at least one hole in the collar device and a step of engaging the snap feature of the collar with the engagement hole in the hood article; the snap feature of the second aperture for engaging the collar device includes a pin having a split; the first aperture includes a plurality of connection devices around an inner circumference of the first aperture so that the hood article is connected radially to an output area of the air mover; the method includes a step of sealing the attachment between the first aperture and the air mover with a sealing material; the step of attaching the hood article to the air mover includes a step inserting a portion of the air mover into the hood article so that the air mover forms a radial connection with the hood article via the plurality of connection devices around the inner circumference; the system is configured so that the air mover is pulling fluid from the system, wherein the fluid exits the hood article through the first aperture; wherein the second section of the air distribution system assembly terminates forming a terminal end that connects to the collar device; the second aperture includes a limiting flange' the first aperture has a generally circular shape; and the second aperture has a generally oblong shape.

14. The method of claim 13, wherein the second aperture and the first aperture are perpendicular.

15. The method of claim 13, wherein the air-impermeable housing is constructed of a plastic, metal, or composite material.

* * * * *

UNITED STATES PATENT AND TRADEMARK OFFICE
CERTIFICATE OF CORRECTION

PATENT NO.        : 8,979,620 B2                                    Page 1 of 1
APPLICATION NO.   : 12/528861
DATED             : March 17, 2015
INVENTOR(S)       : Efthymiou et al.

It is certified that error appears in the above-identified patent and that said Letters Patent is hereby corrected as shown below:

In the Claims

Column 4, Line 67, Claim 4 delete "malarial" and insert -- material --

Signed and Sealed this
Fourteenth Day of July, 2015

Michelle K. Lee
*Director of the United States Patent and Trademark Office*